(12) United States Patent
Hwang

(10) Patent No.: US 9,694,449 B2
(45) Date of Patent: Jul. 4, 2017

(54) WELDING JIG FOR SECONDARY BATTERY

(71) Applicant: Samsung SDI Co., Ltd., Yongin-si, Gyeonggi-do (KR)

(72) Inventor: Seonhee Hwang, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 15/055,464

(22) Filed: Feb. 26, 2016

(65) Prior Publication Data

US 2016/0256963 A1 Sep. 8, 2016

(30) Foreign Application Priority Data

Mar. 5, 2015 (KR) .................. 10-2015-0030810

(51) Int. Cl.
*B23K 37/04* (2006.01)
*H01M 10/04* (2006.01)
*H01M 10/42* (2006.01)

(52) U.S. Cl.
CPC ..... *B23K 37/0443* (2013.01); *H01M 10/0404* (2013.01); *H01M 10/0436* (2013.01); *H01M 10/425* (2013.01)

(58) Field of Classification Search
CPC .......... B23K 37/04–37/0538; H01M 10/0404; H01M 10/425; H01M 10/436; H01M 2/0434

(Continued)

(56) References Cited

U.S. PATENT DOCUMENTS 3,596,898 A * 8/1971 Hilburn .............. B23K 37/0533
                                                  269/243
4,593,850 A * 6/1986 Ariga .................. B23K 37/047
                                                  219/80

(Continued)

FOREIGN PATENT DOCUMENTS

KR     2007-0081545 A    8/2007
KR     2009-0011601 A    2/2009
KR     10-1188628 B1    9/2012

*Primary Examiner* — Kiley Stoner
(74) *Attorney, Agent, or Firm* — Knobbe Martens Olson & Bear LLP

(57) ABSTRACT

There is provided a welding jig for a secondary battery capable of preventing battery cells from floating in a jig by designing the jig so that the thinnest portion in a thickness direction of a battery cell is an alignment reference based on an end at which a terminal unit is positioned in as width direction of a battery cell. The welding jig for a secondary battery includes a main body including a battery cell inserting hole into which at least one battery cell is inserted and a jig inserting opening passing through the main body to expose a lower portion of the battery cell, a first side jig that is positioned on one side of the jig inserting opening of the main body and in which at least one first groove unit is formed to surround one side of an external surface of the battery cell, and a second side jig that is positioned on the other side of the jig inserting opening of the main body and in which at least one second groove unit is formed to surround the other side of the external surface of the battery cell. In a thickness direction of the battery cell, the first groove unit and the second groove unit are formed to be smaller than the battery cell inserting hole.

15 Claims, 4 Drawing Sheets

(58) Field of Classification Search
USPC .......... 228/44.3, 44.7, 47.1, 49.1, 49.5, 58; 29/623.1–623.5, 730–731, 246, 763
See application file for complete search history.

(56) References Cited

U.S. PATENT DOCUMENTS

| | | | | |
|---|---|---|---|---|
| 4,708,330 | A * | 11/1987 | Ehl | B23K 37/0531 269/43 |
| 4,710,608 | A * | 12/1987 | Noda | B23K 37/0426 219/125.1 |
| 4,718,970 | A * | 1/1988 | Bouyoucos | B29C 37/04 156/510 |
| 5,011,068 | A * | 4/1991 | Stoutenburg | B23K 37/047 228/4.1 |
| 5,375,390 | A * | 12/1994 | Frigo | B65B 5/022 53/373.7 |
| 2007/0037052 | A1* | 2/2007 | Jeon | H01M 2/1016 429/152 |
| 2009/0029243 | A1* | 1/2009 | Mori | H01M 2/0426 429/129 |
| 2009/0087737 | A1* | 4/2009 | Yamauchi | H01M 2/22 429/185 |
| 2012/0129010 | A1* | 5/2012 | Hong | H01M 2/1022 429/7 |
| 2013/0029212 | A1* | 1/2013 | Hong | H01M 2/021 429/179 |
| 2014/0072853 | A1* | 3/2014 | Won | H01M 2/204 429/99 |
| 2014/0223729 | A1* | 8/2014 | Chang | H01M 2/02 29/623.2 |
| 2015/0202706 | A1* | 7/2015 | Brosnan | B23K 37/0426 439/78 |
| 2015/0352652 | A1* | 12/2015 | Goodman | B23K 1/0016 228/104 |

* cited by examiner

WELDING JIG FOR SECONDARY BATTERY

RELATED APPLICATIONS

This application claims priority to and the benefit of Korean. Patent Application No. 10-2015-0030810, filed on Mar. 5, 2015, in the Korean Intellectual Property Office, the entire contents of which are incorporated herein by reference in their entirety.

BACKGROUND

Field

The present invention relates to a welding jig for a secondary battery.

Description of the Related Art

Due to increases in development with and demand on technology of mobile devices, demand for secondary batteries is rapidly increasing. Among the secondary batteries, lithium secondary batteries, having high energy densities, high operating voltages, and long lives, are widely used as energy sources of various electronic products as well as various mobile devices.

However, since various combustible materials are mounted in a lithium secondary battery, the lithium secondary battery may be heated and exploded by over-charge, over-current, and physical external shocks. Therefore, a positive temperature coefficient (PTC) element and a protection circuit module (PCM) as safety elements capable of effectively controlling abnormal states such as the over-charge and the over-current are mounted in the lithium secondary battery to be connected to battery cells.

In general, the PCM is connected to the battery cell by welding with a conductive nickel plate interposed. That is, the nickel plate is welded to electrode tabs of the PCM. Then, the nickel plate is welded to electrode terminals of the battery cell so that the PCM is connected to the battery cell and the secondary battery is manufactured.

SUMMARY OF CERTAIN INVENTIVE ASPECTS

An embodiment of the present invention provides a welding jig for a secondary battery capable of preventing battery cells from floating in a jig by designing the jig so that the thinnest portion in a thickness direction of a battery cell is an alignment reference based on an end at which a terminal unit is positioned in a width direction of a battery cell.

A welding jig for a secondary battery according to an embodiment of the present invention includes a main body, a first side jig, and a second side jig.

The main body includes a battery cell inserting hole into which at least one battery cell is inserted and a jig inserting opening passing through the main body to expose h a lower portion of the battery cell. The first side jig is positioned on one side of the jig inserting opening of the main body and at least one first groove is formed in the first side jig to surround one side of an external surface of the battery cell. The second side jig is positioned on the other side of the jig inserting opening of the math body and at least one second groove is formed in the second side jig to surround the other side of the external surface of the battery cell. Here, in a thickness direction of the battery cell, the first groove and the second groove are formed to be smaller than the battery cell inserting hole.

In the thickness direction of the battery cell, sizes of the first groove and the second groove correspond to the thickness of the lower portion of the battery cell.

The first side jig is fixed to the main body.

Terminal units of the battery cell are arranged to be adjacent to one side of the main body in which the first side jig is positioned.

An inside of the jig inserting opening of the main body is hexahedral and alignment members configured to guide a degree of insertion of the first side jig and the second side jig are formed in the jig inserting opening.

The alignment members include a pair of upper alignment members and a pair of lower alignment members that extend from central portions of respective sides of the jig inserting opening toward both ends of the respective sides of the jig inserting opening by a predetermined length to protrude.

A first upper chamfer and a first lower chamfer are formed in the first side jig and a second upper chamfer and a second lower chamfer are formed in the second side jig to correspond to the upper alignment members and the lower alignment members.

A settling groove is formed in a bottom surface of the main body to correspond to the battery cell inserting hole so that the lower portion of the battery cell is settled.

The second groove unit of the second side jig includes a pressing member to correspond to the battery cell.

The pressing member is formed of an elastic material.

The pressing member is formed of sponge or rubber.

A first fixing member and a second fixing member are formed in a region that contacts the first side jig and the second side jig.

The first fixing member and the second fixing member include a magnet.

The first side jig and the second side jig respectively include grip units engraved in external surfaces thereof.

The jig inserting opening of the main body has both surfaces vertical to a width direction of the battery cell penetrated.

According to the present invention, since the jig is designed so as to prevent the battery cells from floating in the jig, alignment dispersion may be reduced in a thickness and width directions of the battery cell. That is, it is possible to reduce an influence of bead interference of the battery cell and to prevent a via hole of a protection circuit module (PCM) from being exposed.

BRIEF DESCRIPTION OF THE DRAWINGS

Example embodiments will now be described more filly hereinafter with reference to the accompanying drawings; however, they may be embodied in different forms and should not be construed as limited to the embodiments set forth herein. Rather, these embodiments are provided so that this disclosure will be thorough and complete, and will full convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION OF CERTAIN INVENTIVE EMBODIMENTS

Figure 1:
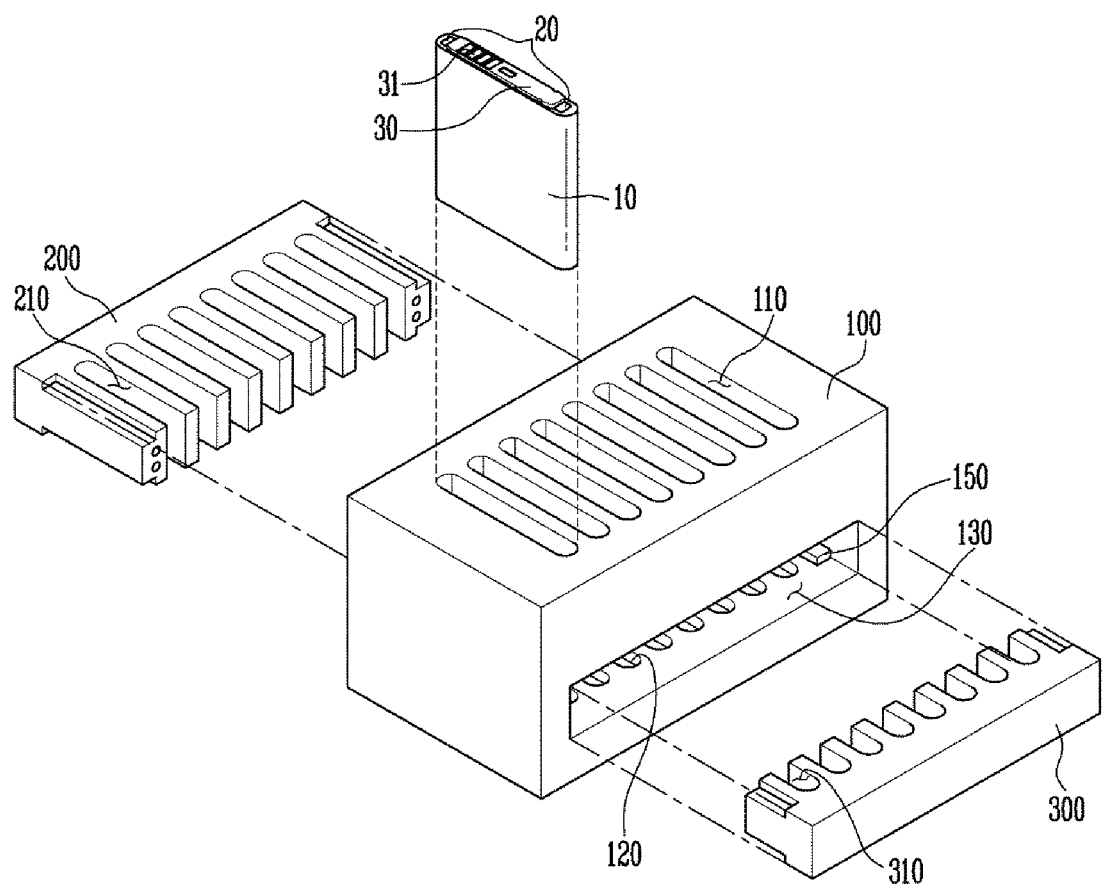
FIG. 1 is an exploded perspective view of a welding jig according to the present invention.

Hereinafter, the embodiments of the present invention and other required matters will be described in detail with reference to the accompanying drawings such that a person skilled in the art easily understands contents of the present invention. However, since the present invention is implemented in various forms within the scope of the claims, the embodiment described hereinafter is merely illustrative in spite of expressions.

In describing embodiments of the present invention, a detailed description of known techniques associated with the present invention unnecessarily obscure the gist of the present invention, it is determined that the detailed description thereof will be omitted. Also, in the drawings, like reference numerals refer to like elements although they are illustrated in different drawings. Also, a thickness or a size of each component in the drawings may be exaggerated for convenience of description and clarity of the specification and may be different from a thickness or a size of an actual component.

Figure 2:
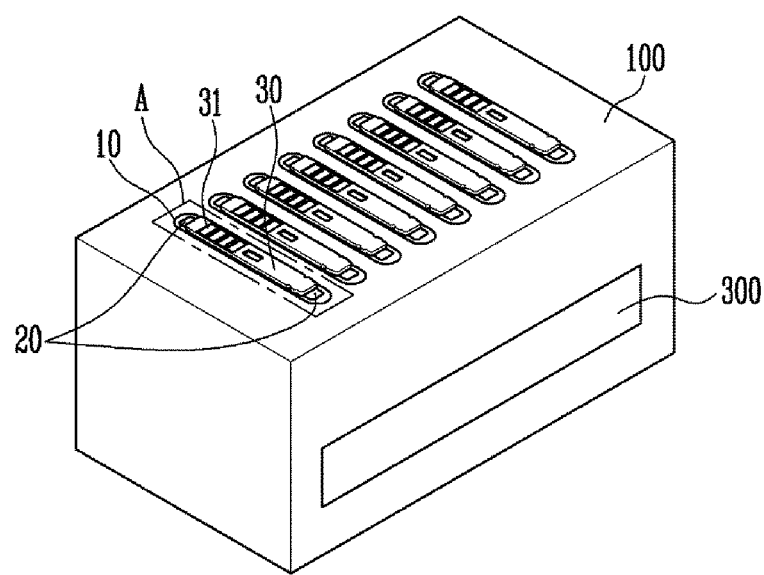
FIG. 2 is a combined perspective view of a welding jig according to the present invention.

FIG. 1 is an exploded perspective view of a welding jig according to the present invention. FIG. 2 is a combined perspective view of a welding jig according to the present invention.

Referring to FIGS. 1 and 2, a welding jig for a secondary battery according to the present invention includes a main body 100, a first side jig 200, and a second side jig 300.

The main body 100 includes battery cell inserting holes 110 and a jig inserting opening or unit 130. The battery cell inserting holes 110 are formed in an upper surface of the main body 100, and at least one battery cell 10 is inserted into each of the battery cell inserting holes 110. The jig inserting opening 130 passes through the main body 100 to expose lower portions of the battery cells 100. The first side jig 200 is positioned on one side of the jig inserting opening 130 of the main body 100 and at least one first groove opening or unit 210 is formed in the first side jig 200 to surround one side of an external surface of the battery cell 10. In addition, a second side jig 300 is positioned on the other side of the jig inserting opening 130 of the main body 100 and at least one second groove opening or unit 310 is formed in the second side jig 300 to surround the other side of the external surface of the battery cell 10.

The first groove unit 210 and the second groove unit 310 are smaller than the battery cell inserting hole 110 in the thickness direction of the battery cell. A central portion of the battery cell 10 may be thicker than other portions thereof in the thickness direction. Therefore, the battery cell inserting hole 110 is formed so that the central portion of the battery cell 10, which is the thickest part, may pass through the battery cell inserting hole 110. Since the first groove unit 210 of the first side jig 200 and the second groove unit 310 of the second side jig 300 are positioned in the lower portion of the battery cell 10, they may be smaller than the battery cell inserting hole 110.

That is, the first side jig 200 and the second side jig 300 may fix the lower portion of the battery cell 10 and may slide from one side and the other side of the jig inserting unit 130 of the main body 100 to be combined with each other. Here, a configuration in which the first side jig 200 and the second side jig 300 are combined with each other will be described with reference to FIGS. 4 and 5A.

The jig inserting opening 130 of the main body 100 may have both sides vertical to a width direction that the battery cell 10 has penetrated. That is, the both sides that face each other of the main body 100 that runs parallel to the thickness direction of the battery cell 10 are penetrated by the opening so that the first side jig 200 and the second side jig 100 are inserted from both sides of a thickness direction of at least one battery cell 10. which leads the battery cell 10 to be fixed.

Further, in the thickness direction of the battery cell 10, sizes of the first groove opening 210 and the second groove opening 310 respectively formed in the first side jig 200 and the second side jig 300 may correspond to a thickness of the lower portion of the battery cell 10. Here, since the sizes of the first groove opening 210 and the second groove opening 310 correspond to the thickness of the lower portion of the battery cell 10, the battery cell 10 may be thinner than the battery cell inserting hole 110 formed on the main body 100 in the thickness direction of the battery cell 10.

Recently, as a width and thickness of the battery cell are reduced, a region in which a protection circuit module (PCM) is mounted and an area in which a connection tab is attached are reduced. Therefore, when a secondary battery is manufactured, process dispersion is significantly applied. When a real battery cell is smaller than the battery cell 10 in comparison with a specification of the battery cell 10, the battery cell floats in the welding jig. Therefore, distance margin between a battery cell bead and the connection tab is insufficient. In addition, a via hole of the PCM is exposed.

The thickness of the lower portion of the battery cell may be smaller than that of the upper or central portion of the battery cell. For example, when a specification of the thickness of the upper portion is 5.47 mm, a specification of the thickness of the lower portion may be smaller than specification of the thickness of the upper portion by 0.02 mm to 0.08 mm. As described above, the thickness of the upper portion of the battery cell is different from the thickness of the lower portion of the battery cell. Therefore, the above-described problems may he solved by designing the welding jig used for welding the PCM to the upper portion of the battery cell to be suitable for the thickness of the lower portion of the battery cell.

That is, the width and thickness of the welding jig for fixing the battery cell are designed considering that the battery cell is commonly formed to be larger than the specification. However, in this ease, since the battery cell floats in the welding jig, according to the embodiments disclosed herein, it is possible to reduce the possibility of a welding defect from occurring by manufacturing the welding jig so that there is less designing margin. Therefore, according to these embodiments, the first groove opening 210 of the first side jig 200 and the second groove opening 310 of the second side jig 300 are formed to be smaller than a conventional welding jig by about 0.1 mm in the thickness direction of the battery cell 10. Therefore, it is possible to reduce alignment dispersion in the thickness direction of the battery cell 10 and to reduce an influence of bead interference on the battery cell 10.

Referring to FIG. 2, terminal units 31 of the battery cells 10 may be arranged to be adjacent to one side of the main body 100 in which the first side jig 200 is positioned. In a state in which the first side jig 200 is inserted from one side of the jig. inserting opening 130 of the main body 100 to be fixed, the second side jig 300 is inserted from the other side of the jig inserting opening 130 of the main body 100. While the second side jig 300 pushes the battery cells 10 toward the first side jig 200, the battery cells 10 are aligned based on one side of the main body 100 in which the terminal units 31 are positioned In FIG. 1, the first side jig 200 is inserted into the main body 100 or is separated from the main body 100. However, the first side jig 200 may be fixed to the main body 100. Therefore, the one side of the main body 100 in which the terminal units 31 of the battery cells 10 are positioned may be a reference line based on which the battery cells 10 are aligned.

Settling grooves 120 may be formed in a bottom surface of the main body 100 to correspond to the battery cell inserting holes 110 so that the lower portions of the battery cells 10 inserted from the battery cell inserting holes 110 are settled in the settling grooves 120. Therefore, before the first side jig 200 and the second side jig 300 are inserted, the battery cells 10 may be settled in the settling grooves 120 to be primarily fixed.

Figure 3:
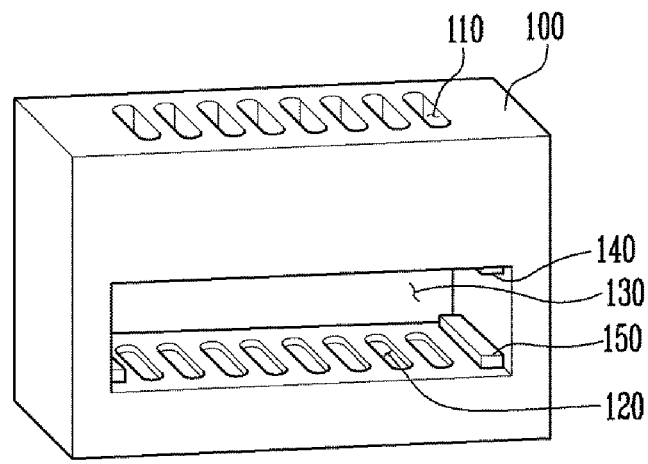
FIG. 3 is a perspective view illustrating a main body of a welding jig according to the present invention.

FIG. 3 is a perspective view illustrating a main body of a welding jig according to the disclosed embodiments.

Referring to FIG. 3, the main body 100 includes the battery cell inserting holes 110 into each of which at least one battery cell 10 is inserted in an upper surface thereof and the jig inserting unit 130 through which the lower portions of the battery cells 10 are exposed.

According to the present invention, the main body 100 and the jig inserting opening 130 is hexahedral. At this time, since the jig inserting opening 130 is formed in the lower portions of the battery cells 10 (refer to FIG. 2), it is possible to prevent or at least inhibit the first side jig 200 and the second side jig 300 from being assembled to be tilting. That is, since the lower portions of the battery cells 10 are less affected by swelling than the central portions of the battery cells 10, it is possible to design the assembly so that the first side jig 200 and the second side jig 300 are inserted from the lower portions of the batter cells 10.

Alignment members 140 and 150 for guiding a degree of insertion of the first side jig 200 and the second side jig 300 may be formed in the jig inserting opening 130. A pair of upper alignment members 140 and a pair of lower alignment members 150 are formed on the respective sides of the jig inserting unit 130 and extend from central portions toward both ends by a predetermined length to protrude.

As described above, the pair of upper alignment members 140 and the pair of lower alignment members 150 are formed at four edges of the jig inserting unit 130 excluding adjacent portions. Therefore, as illustrated in FIGS. 4 and 5A, the first side jig 200 and the second side jig 300 may be aligned by a first upper chamfer and a first lower chamfer of the first side jig 200 and a second upper chamfer and a second lower chamfer of the second side jig 300, which will be described with reference to FIGS. 4 and 5A.

According to the present embodiment, both the upper alignment members 140 and the lower alignment members 150 are formed. However, the upper alignment members 140 or the lower alignment members 150 may be formed. The upper alignment members 140 and the lower alignment members 150 may have various shapes so that the degree of insertion of the first side jig 200 and the second side jig 300 may be guided other than the above shape.

In addition, the settling grooves 120 may be formed in the bottom surface of the main body 100 to correspond to the battery cell inserting holes 110 so that the lower portions of the battery cells 10 are settled in the settling grooves 120.

Figure 4:
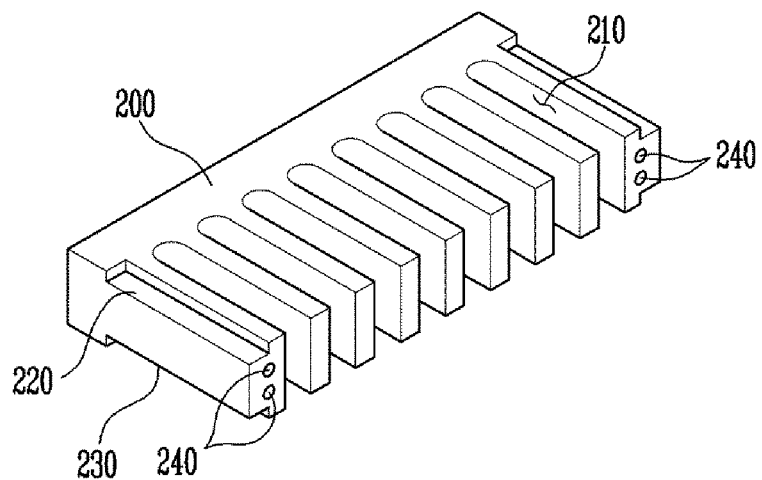
FIG. 4 is a perspective view of a first side jig according to the present invention.
Figure 5A:
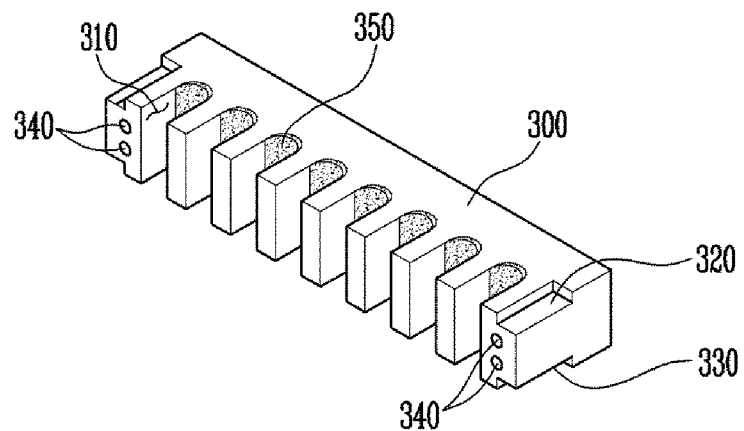
FIG. 5A is a perspective view illustrating one side of a second side jig according to the present invention.

FIG. 4 is a perspective view of a first side jig according to one embodiment of the present invention.

Referring to FIG. 4, the first side jig 200 is positioned on one side of the jig inserting opening 130 of the main body 100 and at least one first groove opening 210 may be formed in the first side jig 200 to surround one side of an external surface of the battery cell 10. The first groove opening 210 may be smaller than the battery cell inserting hole 110 in the thickness direction of the battery cell 10. In addition, in the thickness direction of the battery cell 100, the size of the first groove unit 210 may correspond to the thickness of the lower portion of the battery cell 10.

A first upper chamfer 220 and a first lower chamfer 230 may be formed in the first side jig 200 to correspond to the upper alignment member 140 and the lower alignment member 150 of the main body 100 (refer to FIG. 3). The first upper chamfer 220 and the first lower chamfer 230 may be formed to correspond to the shape of the upper alignment member 140 and the lower alignment member 150 and may guide the first side jig 200 to be settled in the jig inserting unit 130.

The first side jig 200 may be settled in the reference point without being pushed in one direction by the upper alignment member 140 and the lower alignment member 150 of the main body 100 and the first upper chamfer 220 and the first lower chamfer 230 of the first side jig 200.

In addition, the first side jig 200 may include a first fixing member 240 in a region that contacts the second side jig 300 and the first fixing member 240 may be formed of a magnet. Since a magnet is formed in the second side jig 300 to correspond to the first fixing member 240, dining welding, the first side jig 200 and the second side jig 300 may be fixed not to be pulled out of the jig inserting unit 130.

Figure 5B:
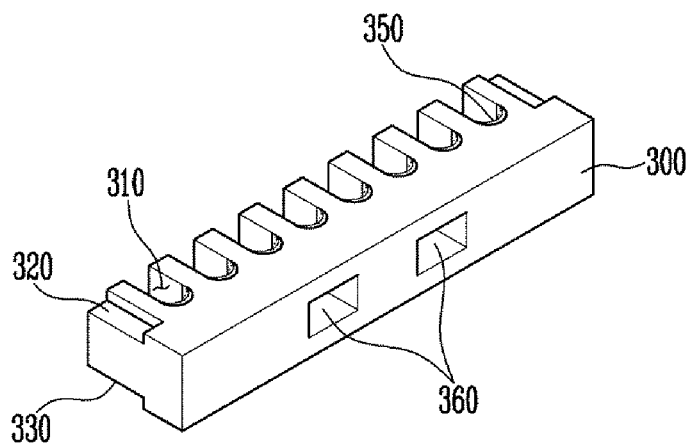
FIG. 5B is a perspective view illustrating the other side of a second side jig according to the present invention.

FIG. 5A is a perspective view illustrating one side of a second side jig according to the present invention. FIG. 5B is a perspective view illustrating the other side of a second side jig according to the present invention.

Referring to FIGS. 5A and 5B, the second side jig 300 is positioned on the other side of the jig inserting opening 130 of the main body 100 and at least one second groove opening 310 may be formed in the second side jig 300 to surround the other side of the external surface of the battery cell 10. A second upper chamfer 320 and a second lower chamfer 110 may be formed in the second side jig 300 to correspond to the upper alignment member 140 and the lower alignment member 150 of the main body 100.

The second upper chamfer 320 and the second lower chamfer 330 may be formed to correspond to the shape of the upper alignment member 140 and the lower alignment member 150 and may guide the second side jig 300 to be settled in the jig inserting unit 130.

In addition, the second groove openings 310 of the second side jig 300 may include pressing members 350 to correspond to the battery cells 10. Here, the pressing members 350 may be formed of an elastic material, for example, sponge or rubber. The pressing members 350 may press the battery cells 10 from the width direction of the battery cells 10 toward the terminal units 31 (refer to FIG. 2). Therefore, the width of the battery cells 10 may be compensated for by about 0.1 mm. In addition, since the battery cell 10 is fixed, a position in which the PCM 30 is settled changes to one side of the battery cell 10 in which the terminal unit 31 is positioned so that the via hole may not be exposed to the outside.

The second side jig 300 may include a second fixing member 340 in a region that contacts the first side jig 200 and the second fixing member 340 may be formed of a magnet. As illustrated in FIG. 4, since the second fixing member 340 is combined with the first fixing member 240 of the first side jig 200, which is formed of a magnet, during welding, the first side jig 200 and the second side jig 300 may be fixed not to be pulled out of the jig inserting unit 130.

Furthermore, the second side jig 300 may include a grip unit 360 engraved in an external surface thereof. Although not shown in the drawing, a grip unit engraved in an external surface of the first side jig 200 may be formed. Therefore, in a conventional art, when a welding laser jig is settled, members that support the first side jig 200 and the second side jig 300 are temporarily removed. However, according to the present invention, there are no members for supporting the first side jig 200 and the second side jig 300.

Figure 6:
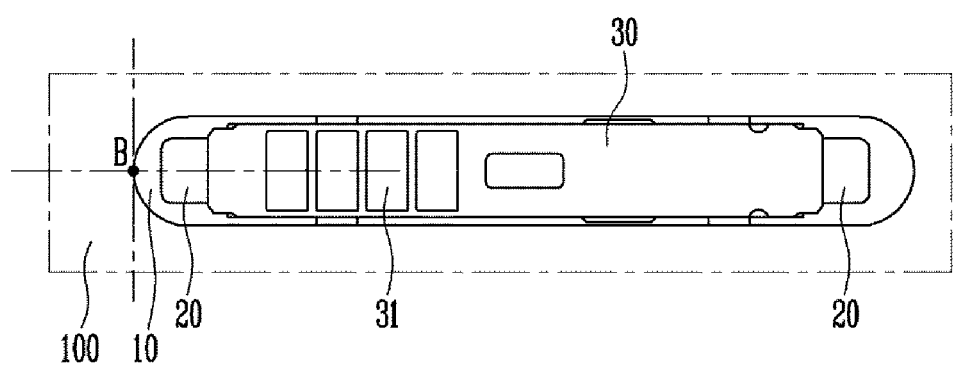
FIG. 6 is a view illustrating an alignment reference point of a welding jig, which is the portion A of FIG. 2.

FIG. 6 is a view illustrating an alignment reference point of a welding jig, which is the portion A of FIG. 2.

Referring to FIG. 6, the terminal units 31 of the battery cell 10 may be arranged to be adjacent to one side of the main body 100 in which the first side jig 200 is positioned. After the battery cell 10 is inserted into the battery cell inserting hole 110, the first side jig 200 is inserted from one side of the jig inserting unit. 130. The first side jig 200 is fixedly settled in a predetermined position by the pair of upper alignment members 140 and the pair of lower alignment members 150 of the main body 100. Therefore, in the battery cell 10. a position of one side in which the terminal units 31 are formed may be aligned.

That is, the terminal unit 31 in which the bead interference of the battery cell 10 may occur and the via hole of the PCM 30 may be exposed is set as the reference point in which the battery cell 10 is aligned so that it is possible to minimize a defect that occurs during welding.

Example embodiments have been disclosed herein, and although specific terms are employed, they are used and are to be interpreted in a generic and descriptive sense only and not for purpose of limitation, hi some instances, as would be apparent to one of ordinary skill in the art as of the tiling of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A welding jig for a secondary battery comprising:
a main body including a battery cell inserting hole into which at least one battery cell is inserted and a jig inserting opening passing through the main body to expose a lower portion of the battery cell;
a first side jig that is positioned on one side of the jig inserting opening of the main body and in which at least one first groove is formed to surround one side of an external surface of the battery cell; and
a second side jig that is positioned on the other side of the jig inserting opening of the main body and in which at least one second groove is formed to surround the other side of the external surface of the battery cell,
wherein, in a thickness direction of the battery cell, the first groove and the second groove are formed to be smaller than the battery cell inserting hole.

2. The welding jig for a secondary battery of claim 1, wherein, in the thickness direction of the battery cell, sizes of the first groove and the second groove correspond to the thickness of the lower portion of the battery cell.

3. The welding jig for a secondary battery of claim 1, wherein the first side jig is fixed to the main body.

4. The welding jig for a secondary battery of claim 1, wherein terminal units of the battery cell are arranged to be adjacent to one side of the main body in which the first side jig is positioned.

5. The welding jig for a secondary battery of claim 1, wherein an inside of the jig inserting opening of the main body is hexahedral and alignment members configured to guide a degree of insertion of the first side jig and the second side jig are formed in the jig inserting opening.

6. The welding jig for a secondary battery of claim 5, wherein the alignment members comprise a pair of upper alignment members and a pair of lower alignment members that extend from central portions of respective sides of the jig inserting opening toward both ends of the respective sides of the jig inserting opening by a predetermined length to protrude.

7. The welding jig for a secondary battery of claim 6, wherein a first upper chamfer and a first lower chamfer are formed in the first side jig and a second upper chamfer and a second lower chamfer are formed in the second side jig to correspond to the upper alignment members and the lower alignment members.

8. The welding jig for a secondary battery of claim 1, wherein a settling groove is formed in a bottom surface of the main body to correspond to the battery cell inserting hole so that the lower portion of the battery cell is settled.

9. The welding jig for a secondary battery of claim 1, wherein the second groove unit of the second side jig comprises a pressing member to correspond to the battery cell.

10. The welding jig for a secondary battery of claim 9, wherein the pressing member is formed of an elastic material.

11. The welding jig for a secondary battery of claim 10, wherein the pressing member is formed of sponge or rubber.

12. The welding jig for a secondary battery of claim 1, wherein the first side jig and the second side jig include a first fixing member and a second fixing member, respectively, at positions where the first and second side jigs contact each other.

13. The welding jig for a secondary battery of claim 12, wherein the first fixing member and the second fixing member comprise a magnet.

14. The welding jig for a secondary battery of claim 1, wherein the first side jig and the second side jig respectively comprise grip units engraved in external surfaces thereof.

15. The welding jig for a secondary batter y of claim 1, wherein the jig inserting opening of the main body has both surfaces vertical to a width direction of the battery cell penetrated.

* * * * *